N. R. POTTER.
SAFETY STARTING DEVICE.
APPLICATION FILED APR. 1, 1912.

1,043,142.

Patented Nov. 5, 1912.

Witnesses:
Clarence W. Carroll
D. Gurnee

Inventor:
Nathaniel R. Potter
by his attorneys
Osgood, Davis & Dorsey

UNITED STATES PATENT OFFICE.

NATHANIEL R. POTTER, OF ROCHESTER, NEW YORK.

SAFETY STARTING DEVICE.

1,043,142.
Specification of Letters Patent.
Patented Nov. 5, 1912.

Application filed April 1, 1912. Serial No. 687,931.

*To all whom it may concern:*

Be it known that I, NATHANIEL R. POTTER, a citizen of the United States, and resident of Rochester, in the county of Monroe and State of New York, have invented certain new and useful Improvements in Safety Starting Devices, of which the following is a specification.

This invention relates to safety-devices for use in connection with manually-operable cranks, or other means, by which internal-combustion engines are started, and the invention is particularly applicable to the starting-cranks of motor-vehicles.

In devices of the kind in question it has heretofore been proposed to employ means operating automatically, upon the occurrence of a reverse rotation or back-kick, to throw the starting-crank out of operative connection with the engine-shaft, by the action of cam-mechanism of some form.

The present invention relates to a device of this type, and the general object of the invention is to produce a mechanism which shall be simple, compact, inexpensive in construction, and reliable in operation, and which may be readily applied to existing starting-cranks without reconstruction thereof.

A particular object of the invention is to provide an arrangement which will permit the operator to rotate the crank freely in the reverse direction, as is frequently convenient, without any inconvenient operation to release pawls or similar devices, and without in any way changing his normal cranking position.

Other objects of the invention, and the features the construction and arrangement by which the several objects are attained, will be noted in connection with the following description of the illustrated embodiment of the invention.

Figure 1:
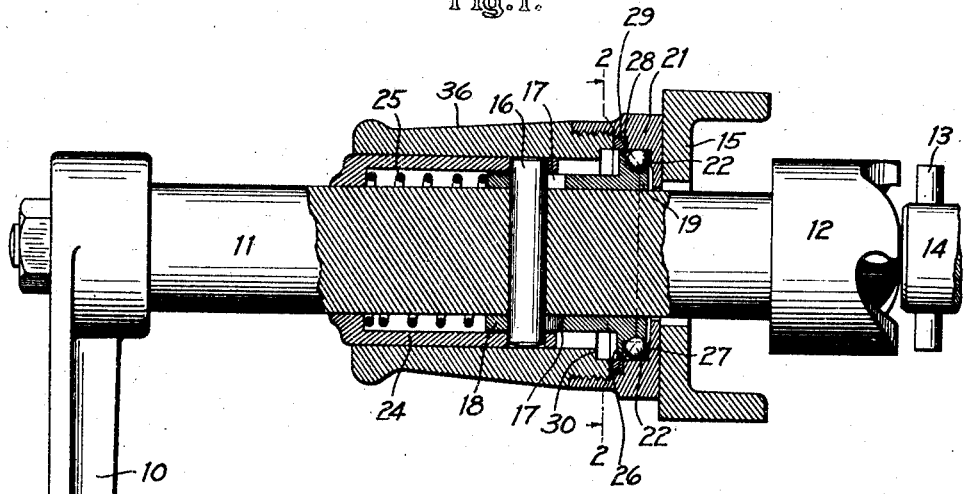
Figure 2:
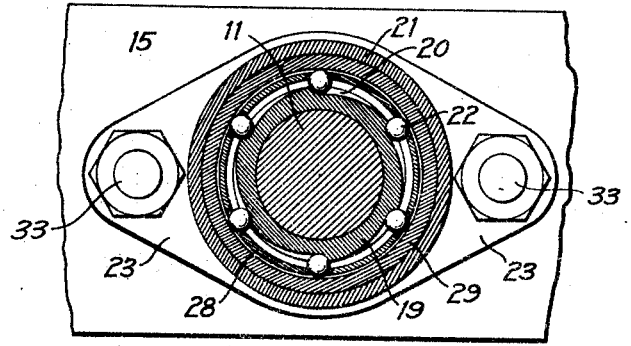

In the accompanying drawings:—Figure 1 is a vertical, median section of a starting-device embodying the present invention; Fig. 2 is a vertical section on the line 2—2 in Fig. 1; and Fig. 3 is a detail-view of the cam-member by which the crank is disconnected from the engine-shaft.

In the illustrated embodiment of the invention I employ a hand-crank 10 and a crank-shaft 11 of ordinary form, the shaft being provided, at its inner end, with any one of the usual clutch devices for connecting the hand-crank with the engine-shaft.

Fixed in the crank-shaft 11 is a cross-pin 16, of which the ends coöperate with inclined slots 17 in a sleeve 18. This sleeve is mounted loosely upon the shaft, so that it may move thereon both rotatively and longitudinally. Such movement is directed and limited, however, by the pin-and-slot connections, so that the shaft, the pin and the sleeve constitute a cam-mechanism, of which both the relative rotative movements and the relative longitudinal movements are limited by the engagement of the pin with the ends of the slots.

Figure 3:
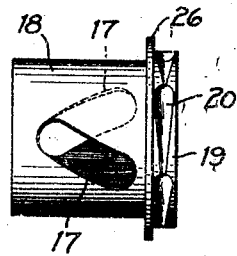

Integral with the right-hand end of the sleeve 18 is a clutch-member 19, which is provided with a series of inclined recesses or sockets 20, as shown in Figs. 2 and 3. This clutch-member 19 coöperates with an annular clutch-member 21, by means of balls 22 which are carried loosely in the sockets and constitute rolling friction-members. The member 21 is fastened to the frame-member 15 by screws 33, which pass through lugs 23 in the member 21, thus fixing it against rotation.

A cylindrical shell 24 is fastened to the crank-shaft 11 by engagement with the ends of the pin 16, and this shell extends inwardly, in engagement with the inner surface of a casing 36. This casing is screwed into the clutch-member 21, and it constitutes a bearing to support the crank-shaft through the intermediation of the shell 24, and also a closure to prevent the ingress of dust or water to the mechanism. The shell 24 provides an abutment for one end of a compression-spring 25, of which the other end engages the end of the sleeve 18. This spring tends, accordingly, to move the sleeve 18 and its clutch-member 19 inwardly, and to hold the elements of the cam-mechanism in the relative position illustrated in Fig. 1.

To use the starting-device above described the operator first presses inwardly against the crank 10, in the usual manner, to cause the clutch-member 12 to engage the cross-pin 13. The resulting longitudinal movement of the crank-shaft causes the cross-pin 16 to traverse the slots 17, and accordingly the pin 16 reaches the right-hand or inner ends of the slots, while the spring 25 is compressed between the shell 24 and the sleeve 18. The operator next turns the crank to the right, in the usual manner, to rotate the engine-shaft. During this movement the pin 16 causes the sleeve 18 to rotate, and the balls 22 slide idly over the surface of the clutch-member 21, this movement being permitted by the arrangement of the sockets 20 as shown. During such movement, however, a flange 26 on the sleeve 18 acts to maintain the balls in frictional engagement with a flange 27 on the clutch-member 21, the balls thus supporting the entire longitudinal thrust of the spring 25. Accordingly, if a reverse rotation or back-kick occurs in the engine-shaft, the corresponding reverse rotation of the crank-shaft and the sleeve 18 causes the balls to roll at once to the shallow portions of the sockets so as to pinch between the clutch-members 19 and 21. The reverse rotation of the sleeve is thus at once arrested, and the pin 16 then traverses the slots 17 in a reverse or left-hand direction, the cam-mechanism thus acting positively to slide the crank-shaft outwardly and thus to disengage the clutch-member 12 from the pin 13. The angle of rotation required for this action is slight, and the starting-crank is thus disengaged from the engine before it is rotated in a reverse direction through a sufficient space to cause injury to the operator, and it is not permitted to rotate even under its momentum alone after having been disengaged from the engine, but is positively stopped.

For convenience in assembling the mechanism, I employ an annular ball-retainer 28 which is provided with a series of perforations through which the balls project to engage the clutch-member 21.

In addition to the reliable and almost instantaneous action of this improved ball-clutch, it has the further advantage of being entirely noiseless, and the present construction is thus distinguished from previous devices, of the same general type, in which ratchets and similar devices have been used, for in such constructions the ratchets make a loud clicking noise when the hand-crank is turned in the direction to start the engine; a feature which is highly objectionable, and which has largely contributed to rendering such previous devices valueless.

As it is frequently desirable to be able to turn the starting-crank backwardly, in order to bring it into a position where it may be conveniently manipulated in starting the engine, the present construction is so arranged that the ball-clutch may be thrown out of operation in a convenient and simple manner to permit the crank to be freely rotated in a left-hand direction. To this end a space is provided in front of the flange 26, as shown in Fig. 1, this space terminating in a shoulder 30 on the casing 36. With the parts in their normal position, as in Fig. 1, if the starting-crank be pulled forwardly the pin 16 draws the sleeve 18 in the same direction, and thus slides the balls 22 forwardly away from the clutch-seat in the member 21, this movement being arrested by engagement of the flange 26 with the shoulder 30. With the parts of the ball-clutch so disengaged the crank may be freely rotated in either direction. In order that the clutch-balls may be held in position to move freely back into engagement with the clutch-surface, a ring 29 is loosely journaled in the space between the clutch-member 21 and the inner end of the casing 36. The inside diameter of this ring is equal to that of the clutch-member 21. Accordingly, the balls will roll or slide freely from one of these parts to the other. When they are in engagement with the ring 29 it is immaterial whether or not they pinch against this ring, since it is free to rotate, and the starting-crank cannot, therefore, be locked when in its forward position.

In one-direction clutches of the type which I employ it is usually found necessary to employ springs engaging the individual balls or rollers and tending constantly to force them into operative relation to the clutch-members. In the present construction, however, owing to the frictional action before described between the balls, the flange 26, and the surface 27, the necessity for such springs is entirely dispensed with. In fact, the spring 25 performs the double function of maintaining the coupling-members 12 and 13 normally out of engagement, and of causing the balls 22 to act, and in this manner I am able to produce a very simple mechanism in which only a single spring is employed.

My invention is not limited to the embodiment thereof hereinbefore described and illustrated in the accompanying drawings, but may be embodied in various other forms within the nature of the invention as it is defined in the following claims.

I claim:—

1. A starting-device for internal-combustion engines having, in combination, a manually-rotatable shaft provided with a coupling-member adapted to be engaged with, and disengaged from, a coöperating member on an engine; a sleeve concentric with said shaft and having a cam-connection therewith adapted to positively limit relative rotation and relative longitudinal movement of the shaft and the sleeve, and to produce, when the shaft and the sleeve are relatively rotated in one direction, a longitudinal movement of the shaft whereby the coupling-members are disengaged; and mechanism for preventing reverse rotation of the sleeve, said mechanism being disengageable by a continuation of such longitudinal movement of the shaft.

2. A starting-device for internal-combustion engines having, in combination, a manually-rotatable shaft provided with a coupling-member adapted to be engaged with, and disengaged from, a coöperating member on an engine; a sleeve concentric with said shaft and having a cam-connection therewith adapted to positively limit relative rotation and relative longitudinal movement of the shaft and the sleeve, and to produce, when the shaft and the sleeve are relatively rotated in one direction, a longitudinal movement of the shaft whereby the coupling-members are disengaged, the sleeve being provided with one member of a one-direction clutch-mechanism; a coöperating member of said mechanism fixed against rotation; and a spring connecting the shaft and the sleeve and tending to produce relative longitudinal movement of said parts whereby the coupling-members are disengaged, the sleeve being longitudinally movable by a continuation of such longitudinal movement of the shaft to throw said clutch-mechanism out of coöperative relation and permit the shaft to be freely rotated in a reverse direction.

3. A starting-device for internal-combustion-engines having, in combination, a manually-rotatable shaft provided with a coupling-member adapted to be engaged with and disengaged from a coöperating member on a engine; a sleeve movable longitudinally and rotatable on the shaft and having a cam-connection therewith adapted to produce, when the shaft and the sleeve are relatively rotated in one direction, a longitudinal movement of the shaft whereby the coupling-members are disengaged; a one-direction clutch having an outer member and an inner member of which one is fixed while the other is rotative with the sleeve, one of said members being provided with a series of inclined sockets and a series of rolling friction-members therein, and the other clutch-member having a smooth annular surface engaged by the friction-members; and a freely rotatable annular-member adjacent the clutch-members and having a bearing-surface substantially continuous with said smooth annular surface; one clutch-member being movable outwardly, through its connections with the manually-rotatable shaft, whereby the rolling friction-members may be caused to disengage said smooth clutch-surface and engage the freely-rotatable annular member, thus permitting the shaft to be freely rotated in either direction while the friction-members are held in position to freely reëngage the smooth clutch-surface.

4. A starting-device for internal-combustion engines having, in combination, a manually-rotatable shaft provided with a coupling-member adapted to be engaged with, and disengaged from, a coöperating member on an engine; a sleeve concentric with said shaft and having a cam-connection therewith adapted to produce, when the shaft and the sleeve are relatively rotated in one direction, a longitudinal movement of the shaft whereby the coupling-members are disengaged; a one-direction clutch of which the inner member is fixed to said sleeve and provided with a series of inclined sockets; an outer clutch-member having a clutch-surface opposed to said sockets, rolling friction-members located in the sockets, and a freely-rotatable ring adjacent the outer clutch-member and having an inner bearing-surface of substantially the same diameter as said clutch-surface, the inner clutch-member being movable outwardly, through its connections with the manually-rotatable shaft, whereby the rolling friction-members may be drawn out of engagement with said clutch-surface and into engagement with the inner surface of said ring, thus permitting the shaft to be freely rotated in either direction.

5. A starting-device for internal-combustion engines having, in combination, a manually-rotatable shaft provided with a coupling-member adapted to be engaged with, and disengaged from, a coöperating member on an engine; a sleeve concentric with said shaft and having a cam-connection therewith adapted to produce, when the shaft and the sleeve are relatively rotated in one direction, a longitudinal movement of the shaft whereby the coupling-members are disengaged; a one-direction clutch of which one member is fixed to said sleeve and the other member is fixed, in stationary position, concentric therewith, said members being coöperatively connected by friction-balls and having bearing-surfaces between which the balls may be frictionally engaged through relative longitudinal movement of the clutch-members; and a compression-spring surrounding said shaft, one end of the spring bearing against said sleeve and the other end being connected with the shaft, the spring tending normally to hold the shaft in its outer position, in which the coupling-members are disengaged and acting also, when the shaft is pushed inwardly, to force said bearing-surfaces into frictional engagement with the clutch-balls whereby the operation of the balls is frictionally controlled to cause them to roll into operative engagement between the clutch-members when reverse-rotation occurs in the sleeve.

6. A starting-device for internal-combustion engines having, in combination, a manually-rotatable shaft provided with a coupling-member adapted to be engaged with, and disengaged from, a coöperating member on an engine; a cross-pin in said shaft; a sleeve loosely mounted on the shaft and having inclined slots engaging said pin whereby relative rotative movements of the sleeve and shaft in one direction cause a relative longitudinal movement thereof; a shell mounted upon the shaft and secured thereto by engagement with the ends of said pin, the shell loosely inclosing the outer end of the sleeve; a compression-spring surrounding the shaft and inclosed within said shell, one end of the spring engaging the outer end of the sleeve; a rotatable clutch-member integral with the inner end of the sleeve and provided with a series of inclined sockets and with a flange adjacent said sockets; an annular, stationary clutch-member surrounding the shaft and having an internal clutch-surface concentric with the rotatable clutch-member and a second surface opposed to the inner surface of said flange; and friction-balls seated in said sockets and adapted to operatively connect the clutch-members, said spring acting, when the shaft is pressed inwardly, to force the sleeve inwardly whereby the balls are frictionally engaged between said flange and said opposed surface, so that upon reverse-rotation of the rotatable members the balls are caused frictionally to roll toward the shallower parts of the sockets and thus to pinch between the clutch-members and arrest such reverse-rotation of the sleeve.

NATHANIEL R. POTTER.

Witnesses:
D. GURNEE,
L. THON.